US009341221B2

(12) United States Patent
Karatas

(10) Patent No.: US 9,341,221 B2
(45) Date of Patent: May 17, 2016

(54) CARRIER BODY FOR A BRAKE LINING OF A DISK BRAKE WITH A DAMPER MASS FOR MODIFYING THE VIBRATION

(71) Applicant: HONEYWELL INTERNATIONAL INC., Morristown, NJ (US)

(72) Inventor: Ilhami Karatas, Schleswig-Holstein (DE)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/311,541

(22) Filed: Jun. 23, 2014

(65) Prior Publication Data

US 2015/0107946 A1    Apr. 23, 2015

(30) Foreign Application Priority Data

Oct. 21, 2013   (DE) .......................... 10 2013 111 584

(51) Int. Cl.
 *F16D 65/095* (2006.01)
 *F16D 65/00* (2006.01)
 *F16D 65/092* (2006.01)

(52) U.S. Cl.
 CPC ........ *F16D 65/0006* (2013.01); *F16D 65/0018* (2013.01); *F16D 65/092* (2013.01)

(58) Field of Classification Search
 CPC .............................. F16D 65/0018; F16F 15/02
 USPC .................................. 188/73.37, 250 E, 250 B
 See application file for complete search history.

(56) References Cited

U.S. PATENT DOCUMENTS

| 4,493,141 | A | * | 1/1985 | Krezak ............................ 29/509 |
| 5,499,440 | A | * | 3/1996 | Satoh et al. ...................... 29/512 |
| 6,913,120 | B2 | * | 7/2005 | Bosco et al. ................. 188/73.37 |
| 6,994,190 | B1 | * | 2/2006 | Gotti et al. .................. 188/73.37 |
| 7,032,723 | B2 | * | 4/2006 | Quaglia et al. .............. 188/73.37 |
| 2006/0096814 | A1 | * | 5/2006 | Hoffrichter et al. ........ 188/73.37 |
| 2007/0045063 | A1 | * | 3/2007 | Naito et al. ................. 188/73.37 |
| 2012/0024643 | A1 | * | 2/2012 | Crippa et al. .................. 188/234 |
| 2012/0152664 | A1 | * | 6/2012 | Crippa et al. .............. 188/73.38 |
| 2015/0107086 | A1 | * | 4/2015 | Karatas et al. .................. 29/525 |

FOREIGN PATENT DOCUMENTS

| DE | 10305308 | A1 | * | 4/2004 |
| DE | 102014205232 | | * | 5/2015 |
| EP | 727591 | B1 | * | 4/2000 |
| JP | 58170933 | A | * | 10/1983 |
| JP | 2013204760 | A | * | 10/2013 |

* cited by examiner

*Primary Examiner* — Thomas J Williams
(74) *Attorney, Agent, or Firm* — Ingrassia Fisher & Lorenz, P.C.

(57) ABSTRACT

In order to improve a carrier body, having a friction lining carrier plate and at least one first damper mass which is connected rigidly to the friction lining carrier plate, in such a way that the rigid connection between the friction lining carrier plate and the first damper mass is more robust, it is proposed to insert a first pin-shaped projection of the first damper mass into the first hole of a friction lining carrier plate in such a way that the head of the first pin-shaped projection protrudes out of the first hole and bears against a first chamfer partially in the region of a first edge of the first hole.

15 Claims, 4 Drawing Sheets

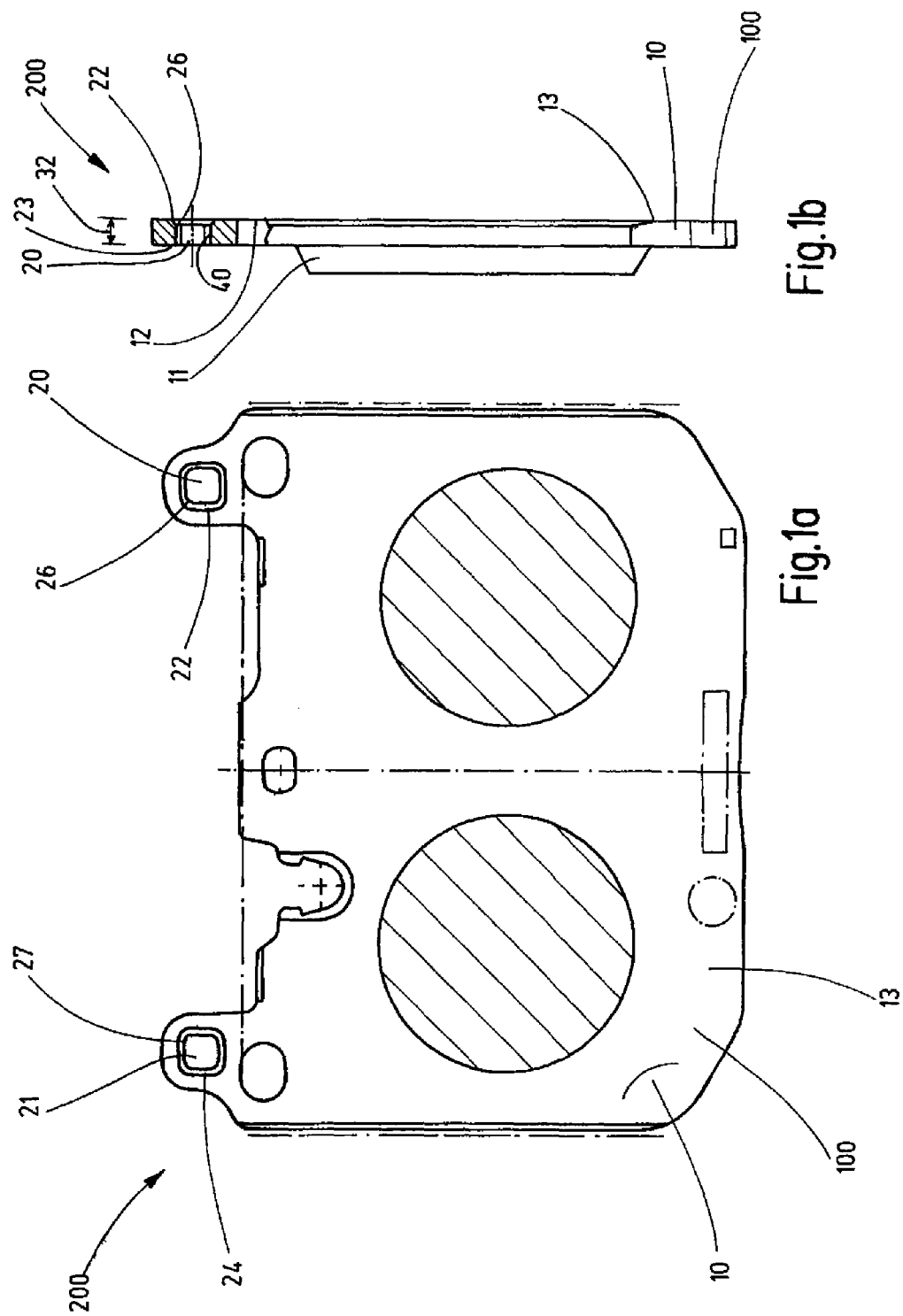

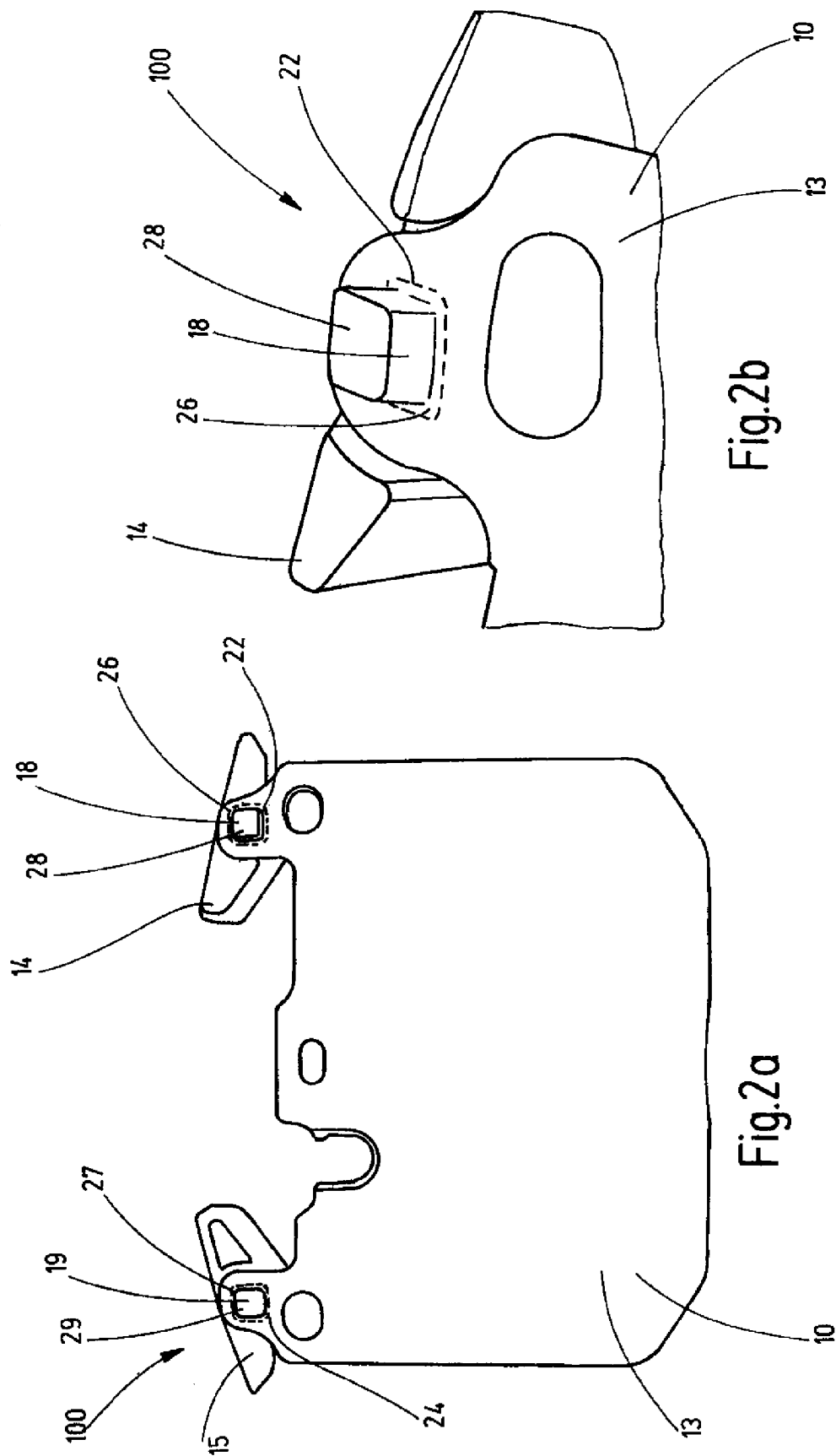

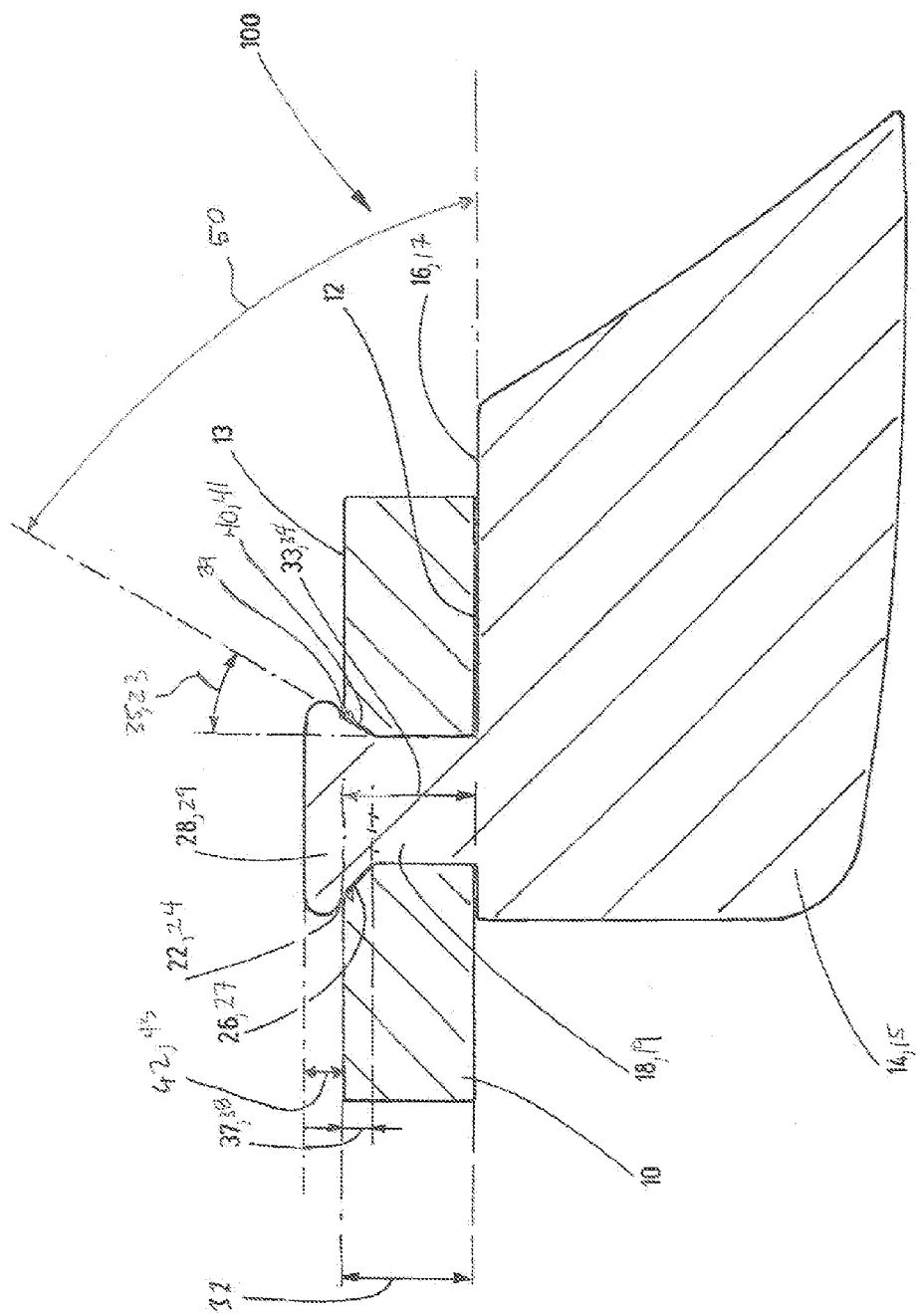

CARRIER BODY FOR A BRAKE LINING OF A DISK BRAKE WITH A DAMPER MASS FOR MODIFYING THE VIBRATION

CROSS-REFERENCE TO RELATED APPLICATION

This application claims priority to German Patent Application No. 102013111584.5, filed Oct. 21, 2013.

TECHNICAL FIELD

The present description relates to a carrier body for a brake lining of a disk brake, at least one first damper mass being arranged rigidly on a friction lining carrier plate of the carrier body for modifying the vibration.

BACKGROUND

It is known from the prior art to attach mass elements to a friction lining carrier plate for brake linings for modifying the vibration and therefore for noise reduction.

EP 1 307 665 B1 has disclosed a brake block for a disk brake, which brake block has a plate for carrying a friction lining, the brake block having a device which is assigned rigidly to the plate, in order to form a single rigid body and for varying the mass of at least one part of the plate, in order to achieve an inertia of the brake block which substantially prevents vibrations of the brake block which might cause a noise of the disk brake during braking.

A brake lining back plate for a brake lining of a vehicle disk brake is described in DE 10 331 052 A2. Here, a damper mass for modifying the vibration is provided on the brake lining back plate, at least one elongate arm being formed integrally on a carrying section for the brake lining, which elongate arm has an end which is connected to the carrying section and a free end, runs without contact next to the carrying section as far as a free end and lies in the main plane of extent of the brake lining back plate.

WO 2009/001 381 A1 has disclosed a brake block for disk brakes, which brake block has a plate which serves as support for a frictional material layer, at least one weight being applied to the plate and being fastened thereto, by means of clamps. The weight modifies the mass of at least one part of the plate, in order to achieve an inertia of the brake block, which inertia substantially prevents the vibrations of the brake block during braking. The weight has at least one abutment face which is suitable for abutting the edge of the plate and, as a result, defines a limitation of the rotation of the weight about a rotational axis of the disk.

BRIEF SUMMARY

Embodiments disclosed herein improve a carrier body for a brake lining of a disk brake having a friction lining carrier plate and at least one first damper mass for modifying the vibration, in such a way that the rigid connection between the friction lining carrier plate and the damper mass is more robust than solutions which are proposed in the prior art and withstands higher loadings.

This problem is solved by the provision of a carrier body for a brake lining of a disk brake, the carrier body having a friction lining carrier plate for receiving a friction lining, and at least one first damper mass which is connected rigidly to the friction lining carrier plate for modifying the vibration. The first damper mass has a first pin-shaped projection which protrudes from a first side face of the first damper mass. The pin-shaped projection has a head at the end of the first pin-shaped projection. The friction lining carrier plate of the carrier body has a first hole for receiving the first pin-shaped projection.

Here, the first pin-shaped projection is inserted into the first hole in such a way that the head and therefore the end of the first pin-shaped projection protrude out of the first hole. Furthermore, a first chamfer, or bevel, is provided in the region of a first edge of the first hole in the friction lining carrier plate. The head, or the end, of the first pin-shaped projection bears at least partially against said first chamfer. The head, or the end of the first pin-shaped projection, is therefore at least partially in direct contact with the chamfer, or with the bevel, in the region of the first edge of the first hole of the friction lining carrier plate.

The carrier body therefore has at least one friction lining carrier plate and a first damper mass which is connected rigidly to said friction lining carrier plate. Here, the friction lining carrier plate can be composed of any suitable material and is of substantially plate-shaped configuration. In order to produce a brake lining, a friction lining, or friction lining material, is applied on a first side face of the friction lining carrier plate.

As a result of the provision of a damper mass which is connected rigidly to the friction lining carrier plate, the vibration can be modified and therefore noise during braking can be reduced. As a result of this, the resonant frequency of the apparatus is therefore modified. As used herein, a damper mass is to be understood to mean a mass element made from any suitable material which is not fastened to a plurality of objects, or connected rigidly to a plurality of objects, but rather is rigidly in connection merely with the friction lining carrier plate of the carrier body.

As used herein, a rigid connection is to be understood to mean a connection between the friction lining carrier plate and the damper mass, the damper mass not being rotatable or pivotable about an axis, but rather being arranged fixedly on the friction lining carrier plate in a defined and predetermined position. The rigid connection between the friction lining carrier plate and the first damper mass can therefore be separated merely by the action of violence or a very high force.

A pin-shaped projection which protrudes from the first side face of the first damper mass is to be understood to mean a projection of elongate configuration. It can be, for example, a cylindrical or conical elongate projection, or else an elongate projection of angular configuration. An elongate projection is to be understood to mean a projection which has a greater length than its maximum width.

The head of the pin-shaped projection is to be understood to mean the end of the pin-shaped projection. The head of the pin-shaped projection is therefore arranged in the region of an end side of the first pin-shaped projection, said end side facing away from the first side face of the first damper mass. Starting from the first side face of the first damper mass, the pin-shaped projection therefore extends to its end or its head. The head of the pin-shaped projection is configured in one piece with the pin-shaped projection. The pin-shaped projection is preferably configured in one piece with the damper mass. The head of the pin-shaped projection is formed by the end-side region of the pin-shaped projection. Before a force is exerted on the pin-shaped projection, or before the production of the rigid connection between the friction lining carrier plate and the first damper mass, the end side of the pin-shaped projection represents its head. During the exertion of force on the pin-shaped projection, said head is deformed and has the shape of a flat head and/or the shape of a mushroom head. Here, after the exertion of the force, said head has a greater diameter or a greater maximum width than the remaining pin-shaped projection. Said head is therefore deformed by the exertion of the force in such a way that it is widened as viewed circumferentially.

Since the first pin-shaped projection is inserted into the first hole of the friction lining carrier plate in such a way that the head of the first pin-shaped projection protrudes out of the first hole, the first pin-shaped projection is of longer configuration than the depth of the first hole. It is preferably provided that, before the exertion of force on the first pin-shaped projection and after the insertion of the first pin-shaped projection into the first hole, the first pin-shaped projection protrudes out of the first hole not only with its end side, but rather also beyond this. After the exertion of the force on the first pin-shaped projection, it still protrudes out of the first hole with its head.

The first edge of the first hole is a circumferential edge which delimits the first hole, in the region of the transition between a second side face of the friction lining carrier plate and the hole inner side, or the inner wall, of the first hole.

As used herein, a chamfer is to be understood to mean a bevel or rounding of the first edge. After the insertion of the first pin-shaped projection into the first hole of the friction lining carrier plate and fastening of the first damper mass to the friction lining carrier plate, the head of the first pin-shaped projection bears at least partially against the first chamfer. The head of the first pin-shaped projection therefore bears tightly at least in regions against the first chamfer. For example, after the exertion of the force on the first pin-shaped projection, the mushroom-shaped or flat head of the first pin-shaped projection bears with its underside and/or edge region against the first chamfer.

An improved positively locking connection between the damper mass and the friction lining carrier plate can be achieved by way of the provision of a first chamfer in the region of the first edge of the first hole in the friction lining carrier plate and the insertion, and the subsequent fastening, of the first pin-shaped projection in the first hole. As a result, the connection between the first damper mass and the friction lining carrier plate becomes more robust. The material of the pin-shaped projection is not damaged, or is not damaged so quickly and easily, in the region of its head during fastening. For example, crack formations can therefore be avoided or at least reduced in the region of the head of the first pin-shaped projection.

A rigid connection between the friction lining carrier plate and the first damper mass can be achieved after the insertion of the first pin-shaped projection into the first hole by the exertion of a force which is directed perpendicularly onto the first pin-shaped projection. The first pin-shaped projection can be upset at least in the region of its head, for example, by way of tumbling or pressing. Tumbling is to be understood to mean substantially perpendicular pressing by means of a pressure head or pusher and simultaneous rotation and/or pivoting of the pressure head or pusher.

Improved and greater upsetting in the region of the center and of the start of the first pin-shaped projection can also be achieved, in particular, by the provision of a first chamfer in the region of the first edge of the first hole of the friction lining carrier plate, in the case of the exertion of a perpendicularly directed force on the end of the first pin-shaped projection. The positively locking connection between the friction lining carrier plate and the first damper mass, or the first pin-shaped projection within the first hole, that is to say the positively locking connection between the first pin-shaped projection and the inner wall of the first hole, can also be increased in this way.

The first chamfer can be configured as a bevel or else as a rounding of the first edge of the first hole of the friction lining carrier plate. A bevel, very particularly preferably a fully circumferential bevel, of the first edge of the first hole of the friction lining carrier plate is preferably formed by the first chamfer. As a result of the provision of the first chamfer, the first hole has a greater opening in this region than in the interior of the first hole.

It is preferably provided, furthermore, that the first chamfer is at a first angle with respect to the inner wall of the first hole, the first angle being between 10° and 80°. The first angle between the first chamfer and the inner wall of the first hole particularly preferably lies between 25° and 60°, and very particularly preferably between 40° and 50°. For example, the first angle might be 45°. Here, the first angle is preferably of substantially constant configuration in a fully circumferential manner around the first hole, or in a fully circumferential manner along the first edge of the first hole.

The first chamfer preferably protrudes over a first depth into the first hole, the first step corresponding to less than 50% of the entire depth of the first hole. The first depth, over which the first chamfer protrudes into the first hole, particularly preferably corresponds to less than 40%, very particularly preferably less than 30% of the entire depth of the first hole. For example, the first chamfer might protrude over a first depth of less than 20% of the entire depth of the first hole into the first hole.

The depth of the first hole corresponds substantially to the thickness of the friction lining carrier plate in the region of the first hole. The first hole is therefore provided in a continuous manner in the friction lining carrier plate. The depth of the first hole is to be understood to mean the entire depth or the length of the first hole through the friction lining carrier plate. The first depth, over which the first chamfer protrudes into the hole, is to be understood to mean the spacing between a plane which lies on the second side face of the friction lining carrier plate and the end of the first chamfer within the first hole along a center axis of the first pin-shaped projection. The first depth is therefore to be understood to mean the spacing which protrudes perpendicularly into the first hole as far as the end of the first chamfer.

The first pin-shaped projection can have any suitable shape. The first pin-shaped projection is preferably of conical configuration. Here, the cross section of the first pin-shaped projection decreases toward the head of the first pin-shaped projection as viewed from the first side face of the first damper mass. The cross section particularly preferably decreases in a constant and linear manner toward the head of the first pin-shaped projection as viewed from the first side face of the first damper mass. It is therefore preferably provided that the first pin-shaped projection is of conical configuration at least in regions or has the shape of a conical segment. Here, the cross section of the first pin-shaped projection can be of round, oval or angular configuration.

At least one notch 39 (see FIG. 4) is preferably arranged in the first chamfer. It is particularly preferably provided here that the at least one notch is arranged around the full circumference of the first hole. It is preferably provided, furthermore, that the notch is arranged in an annular manner in the first chamfer around the first hole. Furthermore, a plurality of notches which are spaced apart from one another can be arranged in an annular manner in the first chamfer around the first hole.

The first side face of the first damper mass preferably bears against a first side face of the friction lining carrier plate. The first damper mass is therefore in direct contact in the region of its first side face with the friction lining carrier plate at least in regions. It is preferably provided here that the friction lining, or the friction lining material, can be arranged on the first side face of the friction lining carrier plate. A damping plate can preferably be arranged on the second side face which faces away from the first side face of the friction lining carrier plate.

It is preferably provided, furthermore, that the inner wall of the first hole is at a second angle 50 (see FIG. 4) with respect to the first side face of the first damper mass, the second angle lying between 75° and 105°, particularly preferably between 80° and 100°, and very particularly preferably between 85° and 95°. For example, the second angle can be of substantially right-angled configuration in the region of a second edge of the first hole. The inlet region of the first hole is therefore preferably of substantially right-angled configuration in the region in which the first side face of the first damper mass bears against the first side face of the friction lining carrier plate, the outlet region of the first hole being beveled by the first chamfer, that is to say in the region of the first edge of the first hole.

The first pin-shaped projection is preferably in contact within the first hole in a substantially fully circumferential manner with the inner wall of the first hole or bears against the latter. A substantially fully circumferential positively locking connection is therefore preferably formed between the first pin-shaped projection and the inner wall of the first hole. The positively locking connection is particularly preferably formed within the first hole between the first pin-shaped projection and the inner wall of the first hole substantially over the entire length or the entire depth of the first hole.

The first pin-shaped projection preferably protrudes with its head over a first length out of the first hole, the first length corresponding to less than 25%, particularly preferably less than 15%, very particularly preferably less than 10% of the entire depth, or length, of the first hole. A friction lining carrier plate for a brake lining of a disk brake for motor vehicles usually has a thickness between 5 mm and 15 mm. For example, the first hole might have an overall depth of 10 mm, the first pin-shaped projection protruding with its head merely over a first length of from 1 mm to 2 mm out of the first hole. The first length, over which the first pin-shaped projection protrudes with its head out of the first hole, is defined after the exertion of the force on the first pin-shaped projection, or after production of the rigid connection between the friction lining carrier plate and the first damper mass.

The first pin-shaped projection can have any suitable cross section. For example, the first pin-shaped projection can have an angular, for example a triangular, rectangular, pentagonal or hexagonal cross section. Furthermore, the first pin-shaped projection might have a round or oval cross section. It is preferably provided here that the shape of the first hole, or the cross section of the first hole, has a corresponding cross section with respect to the cross section of the first pin-shaped projection. Here, the maximum width of the pin-shaped projection is preferably configured to be slightly smaller than the minimum opening width of the first hole. The first pin-shaped projection can therefore be inserted into the first hole without deformation or a relatively great action of force.

Upsetting, or deformation of the first pin-shaped projection in the head region and preferably within the first hole is achieved only after the insertion of the first pin-shaped projection into the first hole, by the exertion of a force which is directed perpendicularly onto the head region of the first pin-shaped projection. As a result, the first pin-shaped projection is upset and a positively locking connection is achieved between the first pin-shaped projection and the inner wall of the first hole.

It is preferably provided, furthermore, that the carrier body has a second damper mass which is connected rigidly to the friction lining carrier plate for modifying the vibration. The second damper mass is preferably configured in the same way as the first damper mass. Here, the friction lining carrier plate has a second hole, through which the second pin-shaped projection, namely the pin-shaped projection of the second damper mass, can be inserted. All the abovementioned features with regard to the first damper mass, and the first hole in the friction lining carrier plate, are also provided for the second damper mass and the second hole of the friction lining carrier plate. For example, the friction lining carrier plate has a second chamfer in the region of the first edge of the second hole, which second chamfer is in connection with the head of the second pin-shaped projection at least in regions after the insertion of the second pin-shaped projection.

Furthermore, a brake lining for a disk brake is provided. Here, the brake lining has an above-described carrier body and a friction lining which is arranged on the friction lining carrier plate.

Furthermore, a disk brake, in particular a partially lined disk brake, is provided which has an above-described brake lining having a carrier body as claimed in claims 1 to 13 and a friction lining which is arranged on the friction lining carrier plate of the carrier body.

Furthermore, a method for producing a carrier body is provided, the carrier body having a friction lining carrier plate for receiving a friction lining and at least one first damper mass which is connected rigidly to the friction lining carrier plate. The following steps may be provided for producing the carrier body:

a) insertion of the first pin-shaped projection of the first damper mass into the first hole, in such a way that the end of the first pin-shaped projection, or the head of the first pin-shaped projection, protrudes out of the first hole, b) pressing of the first damper mass onto the friction lining carrier plate, in order that the first side face of the first damper mass bears at least in regions against a first side face of the friction lining carrier plate, or is in contact with said first side region, c) exertion of a force which is directed substantially perpendicularly onto the first pin-shaped projection, by tumbling or pressing until the first pin-shaped projection bears with its head partially in the region of the first edge of the first hole against the first chamfer, said force being exerted while the first damper mass is being pressed onto the friction lining carrier plate.

BRIEF DESCRIPTION OF THE DRAWINGS

FIG. 1a shows a diagrammatic illustration of a brake lining having a friction lining carrier plate and holes arranged therein for receiving damper masses, FIG. 1b shows a cross section of a brake lining having a friction lining carrier plate and a friction lining which is arranged on the friction lining carrier plate, FIG. 2a shows a perspective view of a carrier body having a friction lining carrier plate and two damper masses which are arranged thereon, FIG. 2b shows a perspective view of a detail of a friction lining carrier plate and the damper mass which is connected thereto, FIG. 4 shows a cross-sectional illustration of a detail of the connection of a damper mass to the friction lining carrier plate.

DESCRIPTION OF EMBODIMENTS

Figure 3A:
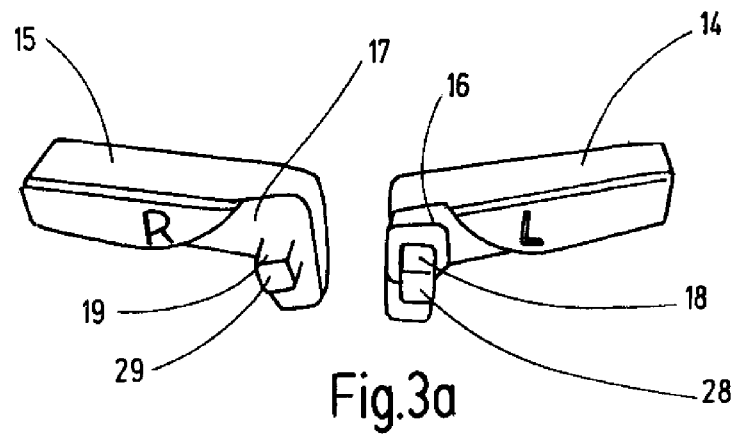
FIGS. 3a-3d show different shapes of damper masses.

FIGS. 1a and 1b show a brake lining 200 in a front view and in cross section. The brake lining 200 has a carrier body 100, merely the friction lining carrier plate 10 of the carrier body 100 being shown without damper masses 14, 15 attached thereto. Furthermore, the brake lining 200 has a friction lining 11 which is arranged on the first side face 12 of the friction lining carrier plate 10.

On its two upper corner regions, the friction lining carrier plate 10 has in each case one hole, namely a first hole 20 and a second hole 21 for receiving the pin-shaped projections 18, 19 of the two damper masses 14, 15. Here, the outlet opening of the first hole is delimited by a first circumferential edge 22 on the second side face 13 of the friction lining carrier plate 10. A first chamfer 26 is arranged in the region of said first edge 22 of the first hole 20. As a result, the first edge 22 of the first hole 20 is beveled circumferentially. The friction lining carrier plate 10 has a thickness 32 which, in the region of the first hole 20 and the second hole 21, corresponds to the respective depth 33, 34 of the corresponding hole 20, 21. The first chamfer 26 and the second chamfer 27 protrude over a first depth 37, and a second depth 38, into the first hole 20, and into the second hole 21, respectively. The first chamfer 26 is at a first angle 35 with respect to the inner wall 40 of the first hole 20. The second chamfer 27 is at a second angle 23 with respect to the inner wall 41 of the second hole 21.

FIGS. 2a and 2b show a perspective view of a carrier body 100 having a friction lining carrier plate 10 and two damper masses 14, 15 which are fastened rigidly thereto. Here, the first damper mass 14 is arranged with its first pin-shaped projection 18 in the first hole 20 of the friction lining carrier plate 10. As can be seen from FIGS. 2a and 2b, the end or the head 28 of the first pin-shaped projection 18 protrudes out of the first hole 20.

In order to connect the two damper masses 14, 15 fixedly and rigidly to the carrier plate 10, a force is exerted on the first pin-shaped projection 18, and on the second pin-shaped projection 19, perpendicularly by way of tumbling or pressing. Here, both the first pin-shaped projection 18 and the second pin-shaped projection 19 are upset and, in particular in the region of the head 28 of the first pin-shaped projection 18 and in the region of the head 29 of the second pin-shaped projection 19, are deformed in such a way that the respective head 28, 29 of the two pin-shaped projections 18, 19 bears at least partially against the respective chamfer 26, 27 in the region of the first edge 22 of the first hole 20, and in the region of the first edge 24 of the second hole 21. After the exertion of the force, and after the production of the rigid connection of the two damper masses 14, 15 to the friction lining carrier plate 10, the respective pin-shaped projections 18, 19 protrude over a first length 42, and a second length 43, out of the respective hole 20, 21. Reference is also made to FIG. 4 in this regard. FIGS. 2a and 2b show the stage before the exertion of the force, or before the production of the rigid connection. In FIGS. 2a and 2b, the two damper masses 14, 15 are inserted with their pin-shaped projections 18, 19 into the holes 20, 21.

Figure 3B:
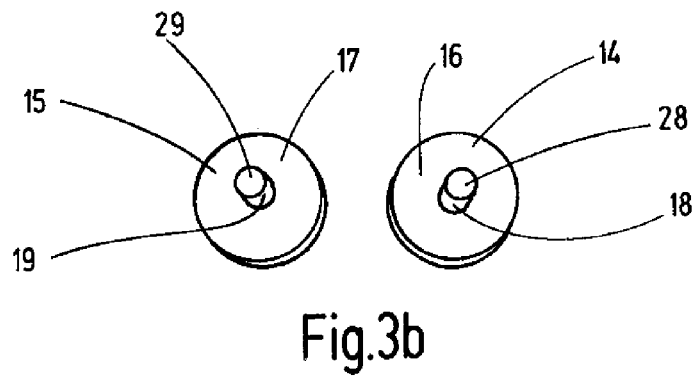
Figure 3C:
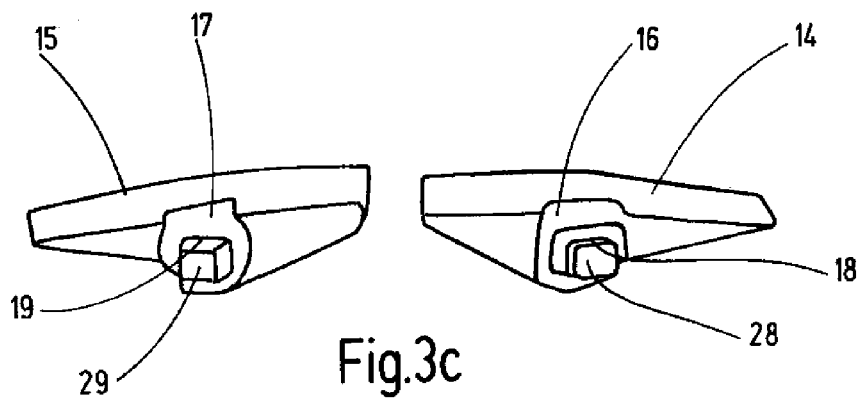
Figure 3D:
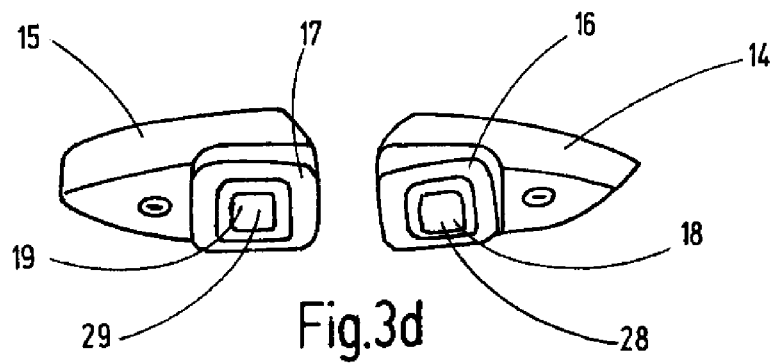

FIGS. 3a to 3d show different shapes of damper masses 14, 15. Regardless of the shape of the respective damper mass 14, 15, each damper mass 14, 15 has a first, and second, pin-shaped projection 18, 19 which protrudes from the first side face 16 of the first damper mass 14, and from the first side face 17 of the second damper mass 15. Here, the pin-shaped projections 18, 19 can be configured so as to be substantially round (cf. FIG. 3b) and, however, also angular (cf. FIGS. 3a, 3c and 3d).

After the connection of the two damper masses 14, 15 to the friction lining carrier plate 10, the respective first side face 16, 17 of the two damper masses 14, 15 is connected to the first side face 12 of the friction lining carrier plate 10, or bears against said first side face 12. FIG. 4 shows a sectional illustration of the fastening region between the friction lining carrier plate 10 and the first damper mass 14 or the second damper mass 15. Here, the first pin-shaped projection 18 of the first damper mass 14 or the second pin-shaped projection 19 of the second damper mass 15 is inserted into the first hole 20 or the second hole 21, respectively, of the friction lining carrier plate 10. The first damper mass 14 or the second damper mass 15 bears with the first side face 16, 17 of the first damper mass 14 or the second damper mass 15 against the first side face 12 of the friction lining carrier plate 10. A rigid connection between the friction lining carrier plate 10 and the first damper mass 14 or the second damper mass 15 has been achieved by way of tumbling or pressing of the first pin-shaped projection 18 or the second pin-shaped projection 19. On account of the provision of the first chamfer 26 in the region of the first edge 22 of the first hole 20 or the second chamfer 27 of the second hole 21, the first pin-shaped projection 18 or the second pin-shaped projection has been upset over the entire depth 33 of the first hole 20 or the entire depth 34 of the second hole 21, respectively, in such a way that a positively locking connection which is formed over the full circumference and over the entire depth 33 of the first hole 20 or the entire depth 34 of the second hole 21, respectively, can be seen between the first pin-shaped projection 18 and the inner wall 40 of the first hole 20 within the first hole 20 or between the second pin-shaped projection 19 and the inner wall 41 of the second hole 21, respectively. The first pin-shaped projection 18 protrudes with its head 28 over a first length 42 out of the first hole 20 and the second pin-shaped projection 19 protrudes with its head 29 over a second length 43 out of the second hole 21.

Furthermore, the head 28 of the first pin-shaped projection 18 bears directly in regions against the first chamfer 26 in the region of the first edge 22 of the first hole 20.

In the region of the first hole 20, the friction lining carrier plate 10 has a thickness 32 which corresponds to the depth 33 of the first hole 20. The first chamfer 26 protrudes over a first depth 37 into the first hole 20. Furthermore, the first chamfer forms a first angle 35 with respect to the inner wall 40 of the first hole 20.

The invention claimed is:

1. A carrier body for a brake lining of a disk brake (300), the carrier body (100) comprising:
   a friction lining carrier plate (10) for receiving a friction lining (11), the friction lining carrier plate (10) having a first hole (20), the first hole including a first edge (22) and a first chamfer (26) partially in a region of the first edge, and at least one notch (39) in the first chamfer (26), the notch extending around a full circumference of the first hole (20); and
   a first damper mass (14) rigidly connected to the friction lining carrier plate (10) for modifying the vibration, the first damper mass (14) including:
      a first side face (16),
      a first pin-shaped projection (18) protruding from the first side face (16), the first pin-shaped projection (18) having a head (28) and facing away from the first side face (16) of the first damper mass (14),
      wherein the first pin-shaped projection (18) is inserted into the first hole (20) in such a way that the head (28) of the first pin-shaped projection (18) protrudes out of the first hole (20) and bears against the first chamfer (26) partially in the region of the first edge (22) of the first hole (20).

2. The carrier body (100) of claim 1, wherein the first chamfer (26) forms a bevel of the first edge (22).

3. The carrier body (100) of claim 1, wherein:
the first hole has an inner wall (40);
the first chamfer (26) is disposed at a first angle (35) with respect to the inner wall (40);
the first angle (35) is between 10 degrees and 80 degrees.

4. The carrier body (100) of claim 3, wherein the first angle is between 25 degrees and 60 degrees.

5. The carrier body (100) of claim 3, wherein the first angle is between 40 degrees and 50 degrees.

6. The carrier body (100) of claim 1, wherein:
the first chamfer (26) protrudes over a first depth (37) into the first hole (20);
the first depth (37) less than 50% of a depth (33) of the first hole (20).

7. The carrier body (100) of claim 1, wherein the first pin-shaped projection (18) is conical, whereby its cross section decreases toward the head (28) of the first pin-shaped projection (18) as viewed from the first side face (16) of the first damper mass (14).

8. The carrier body (100) of claim 1, wherein the carrier body (100) further includes a second damper mass (15) connected rigidly to the friction lining carrier plate (10) for modifying the vibration.

9. The carrier body (100) of claim 1, wherein the first side face (16) of the first damper mass (14) bears against a first side face (12) of the friction lining carrier plate (10).

10. The carrier body (100) of claim 3, wherein:
the inner wall (40) of the first hole (20) is disposed at a second angle (50) with respect to the first side face (16) of the first damper mass (14); and
the second angle (50) is between 75 degrees and 105 degrees.

11. The carrier body (100) of claim 3, wherein the second angle is between 80 degrees and 100 degrees.

12. The carrier body (100) of claim 3, wherein the second angle is between 85 degrees and 95 degrees.

13. The carrier body (100) of claim 1, wherein the first pin-shaped projection (18) forms a positively locking connection with the inner wall (40) of the first hole (20) within the first hole (20) substantially over the full circumference.

14. The carrier body (100) of claim 1, wherein the first pin-shaped projection (18) forms a positively locking connection with the inner wall (40) of the first hole (20) within the first hole (20) substantially over an entire depth (33) of the first hole (20).

15. The carrier body (100) of claim 1, wherein the first pin-shaped projection (18) protrudes with its head (28) over a first length (42) out of the first hole (20).

* * * * *